United States Patent
Rajasekaram et al.

(10) Patent No.: US 10,109,273 B1
(45) Date of Patent: Oct. 23, 2018

(54) EFFICIENT GENERATION OF PERSONALIZED SPOKEN LANGUAGE UNDERSTANDING MODELS

(71) Applicant: Amazon Technologies, Inc., Reno, NV (US)

(72) Inventors: Arushan Rajasekaram, Seattle, WA (US); Nikko Strom, Kirkland, WA (US); Madan Mohan Rao Jampani, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 76 days.

(21) Appl. No.: 14/014,154

(22) Filed: Aug. 29, 2013

(51) Int. Cl.
*G10L 15/065* (2013.01)
*G10L 15/183* (2013.01)
*G10L 15/30* (2013.01)
*G10L 15/18* (2013.01)

(52) U.S. Cl.
CPC ............ *G10L 15/18* (2013.01); *G10L 15/065* (2013.01); *G10L 15/183* (2013.01); *G10L 15/30* (2013.01)

(58) Field of Classification Search
CPC ...... G10L 15/183; G10L 15/30; G10L 15/065
USPC ........................................................ 704/257
See application file for complete search history.

(56) References Cited

U.S. PATENT DOCUMENTS

| 5,425,128 A | 6/1995 | Morrison |
| 6,418,431 B1 * | 7/2002 | Mahajan et al. |
| 6,499,013 B1 * | 12/2002 | Weber ................. G06F 17/27 704/251 |
| 6,622,119 B1 * | 9/2003 | Ramaswamy ........ G06F 17/276 704/275 |
| 7,072,838 B1 * | 7/2006 | Ghosh et al. ................ 704/257 |
| 7,137,126 B1 | 11/2006 | Coffman et al. |
| 7,899,673 B2 * | 3/2011 | Brown .......................... 704/270 |
| 8,775,174 B2 | 7/2014 | Conejero et al. |
| 8,838,457 B2 * | 9/2014 | Cerra et al. .................. 704/275 |
| 8,880,405 B2 * | 11/2014 | Cerra et al. .................. 704/275 |
| 8,886,540 B2 * | 11/2014 | Cerra et al. .................. 704/270 |
| 8,930,402 B1 | 1/2015 | Singh |
| 8,996,372 B1 | 3/2015 | Secker-Walker et al. |
| 8,996,379 B2 * | 3/2015 | Cerra et al. .................. 704/270 |
| 9,324,323 B1 * | 4/2016 | Bikel .................... G10L 15/183 |
| 2003/0120493 A1 | 6/2003 | Gupta |
| 2004/0015365 A1 | 1/2004 | Ohmori et al. |
| 2004/0044517 A1 * | 3/2004 | Palmquist ........... G06F 17/2809 704/7 |

(Continued)

*Primary Examiner* — Richemond Dorvil
*Assistant Examiner* — Bryan S Blankenagel
(74) *Attorney, Agent, or Firm* — Knobbe, Martens, Olson and Bear, LLP

(57) ABSTRACT

Features are disclosed for maintaining data that can be used to personalize spoken language understanding models, such as speech recognition or natural language understanding models. The personalization data can be used to update the models based on some or all of the data. The data may be obtained from various data sources, such as applications or services used by the user. Personalized spoken language understanding models may be generated or updated based on updates to the personalization data or some other portion of the stored personalization data. Generation of personalized spoken language understanding models may be prioritized such that the generation process accommodates multiple users.

33 Claims, 5 Drawing Sheets

(56) References Cited

U.S. PATENT DOCUMENTS

| | | | |
|---|---|---|---|
| 2005/0125218 A1* | 6/2005 | Rajput | G06F 17/2818 704/8 |
| 2005/0171926 A1* | 8/2005 | Thione | G06F 17/24 |
| 2007/0033004 A1* | 2/2007 | Bangalore | G10L 15/183 704/9 |
| 2007/0043574 A1 | 2/2007 | Coffman et al. | |
| 2008/0127295 A1* | 5/2008 | Pirzada | G06F 21/554 726/1 |
| 2008/0154870 A1 | 6/2008 | Evermann et al. | |
| 2009/0222600 A1 | 9/2009 | Lehr et al. | |
| 2009/0292530 A1* | 11/2009 | Jarmulak et al. | 704/10 |
| 2010/0057687 A1* | 3/2010 | Shen | G06F 17/3064 |
| 2010/0275118 A1* | 10/2010 | Iakobashvili | G06F 17/273 715/257 |
| 2010/0298010 A1 | 11/2010 | Roth et al. | |
| 2010/0299225 A1* | 11/2010 | Aarni | G06Q 20/20 705/27.2 |
| 2010/0306280 A1* | 12/2010 | Sapek | G06F 17/30607 707/803 |
| 2010/0324901 A1* | 12/2010 | Carter | G10L 15/065 704/255 |
| 2010/0325126 A1* | 12/2010 | Rajaram | G06Q 30/02 707/759 |
| 2010/0332234 A1* | 12/2010 | Agapi et al. | 704/275 |
| 2011/0022945 A1* | 1/2011 | Yang | G06F 17/30899 715/234 |
| 2011/0029307 A1* | 2/2011 | Parthasarathy et al. | 704/231 |
| 2011/0066634 A1 | 3/2011 | Phillips et al. | |
| 2011/0153663 A1* | 6/2011 | Koren | G06F 17/30964 707/776 |
| 2011/0231189 A1 | 9/2011 | Anastasiadis et al. | |
| 2012/0029904 A1* | 2/2012 | Precoda | G10L 15/06 704/2 |
| 2012/0059653 A1* | 3/2012 | Adams | G10L 15/19 704/243 |
| 2012/0059813 A1* | 3/2012 | Sejnoha | G06F 17/30637 707/707 |
| 2012/0173237 A1* | 7/2012 | Dow et al. | 704/244 |
| 2012/0223889 A1* | 9/2012 | Medlock | G06F 3/04883 345/168 |
| 2012/0233207 A1* | 9/2012 | Mohajer | G06F 17/30663 707/769 |
| 2012/0265764 A1 | 10/2012 | Agrawal et al. | |
| 2013/0086029 A1* | 4/2013 | Hebert | G06F 17/30646 707/706 |
| 2013/0325474 A1 | 12/2013 | Levien et al. | |
| 2014/0081636 A1 | 3/2014 | Erhart et al. | |
| 2014/0129757 A1 | 5/2014 | Lo et al. | |
| 2015/0058018 A1* | 2/2015 | Georges | G10L 15/08 704/257 |
| 2015/0220556 A1 | 8/2015 | Lunden et al. | |

* cited by examiner

EFFICIENT GENERATION OF PERSONALIZED SPOKEN LANGUAGE UNDERSTANDING MODELS

BACKGROUND

Spoken language understanding systems typically include one or more models that they use to processing input. For example, automatic speech recognition systems typically include an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Acoustic models, language models, natural language understanding models, and other models used in spoken language understanding (together referred to as spoken language understanding models), may be specialized or customized to varying degrees. For example, an automatic speech recognition system may have a general or base model that is not customized in any particular manner, and any number of additional models for particular genders, age ranges, regional accents, or any combination thereof. Some systems may have models for specific subject matter (e.g., medical terminology) or even specific users.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
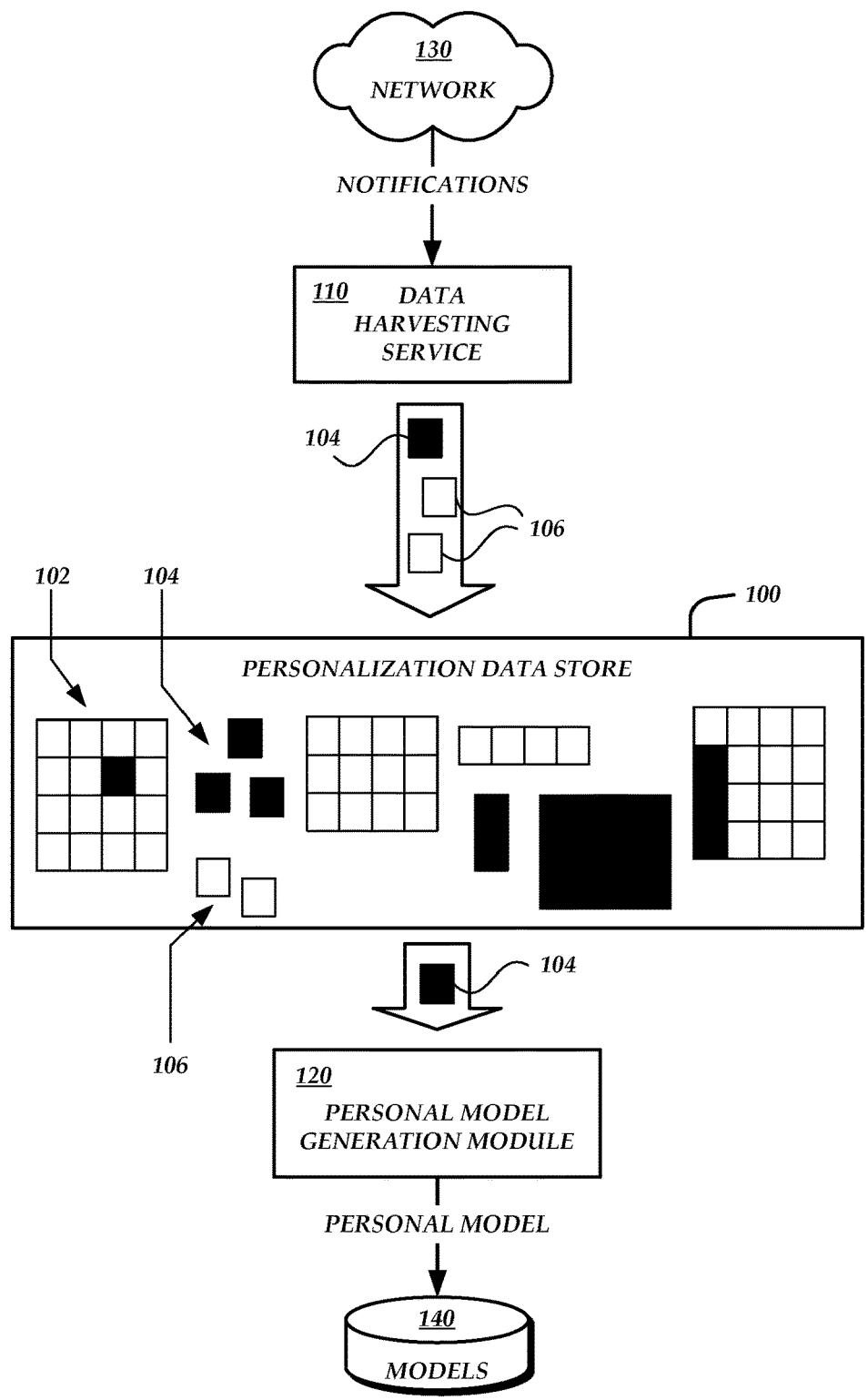
FIG. 1 is a block diagram of an illustrative architecture for personal model generation, including a data harvesting service, a personalization data store, and a personal model generation module.

The present disclosure is directed to maintaining user-specific personalization data and efficiently generating personal spoken language understanding ("SLU") models, such as personalized automatic speech recognition ("ASR") models or Natural Language Understanding ("NLU") models, from that data. In some speech processing systems, personalized or customized models (e.g., language models, acoustic models, NLU models) may be generated and used. A system may access user-specific information relevant to providing personalization in spoken language understanding in order to generate personal models. However, user-specific data relevant to spoken language understanding may often change. For example, song titles and artist names for music in a user's music catalog may be useful in providing personalization in speech recognition and/or natural language understanding. Users may often purchase new music, delete unwanted music, and so on, thereby making it difficult for separate systems, such as ASR systems, to keep up-to-date music catalog information for a user (or thousands or millions of users). In addition, the most recent changes to the user's catalog may be the best predictors of what a user will say at a particular time (e.g., after purchasing a song, the next utterance may be more likely to include a command to play the new song than to do anything else, including playing older music). Unless a personalized language model or NLU model incorporating the new song's title (or incorporating an increased score or rank for the song's title) is quickly generated and made available for use in ASR or NLU processing, the benefits of personalized models may not be fully realized.

Aspects of the present disclosure relate to rapid generation of personal spoken language understanding models such that personalization based on recent user activity is available for use in SLU processing earlier than would otherwise be possible. Spoken language understanding models may include acoustic models (examples include hidden Markov models and Gaussian mixture models), language models (examples include grammars and n-gram language models), and natural language understanding models (examples include named entity recognition models and intent models). In some embodiments, the spoken language models may by updated by using a process that is more computationally efficient than rebuilding the models.

In some embodiments, an n-gram language model or a grammar may be updated by adding new information, such as a purchase of a new song by a user. For example, where the new information is not present in an n-gram language model, new n-grams (e.g., a unigram or bigram) may be added to the n-gram language model to take into account the new information. Where the new information is present in the n-gram language model, scores (e.g., likelihoods or probabilities) for n-grams corresponding to the new information may be adjusted. Similarly, where the new information is not present in a grammar, a new path may be added to the grammar to take into account the new information, and when the new information is present in the grammar, scores corresponding to the new information may be adjusted.

In some embodiments, personal language models for ASR are generated using a process that includes converting personalization data into an intermediate grammar format (e.g., a text file containing a representation of the grammar, such as a grammar extensible markup language file, or "GrXML" file), and then generating the personal model (e.g., a compiled or otherwise optimized version of the model, such as a finite state transducer, or "FST"). In this process, converting the personalization data into the intermediate grammar format, also known as a grammar specification, can take substantially longer than generating the personal model from the grammar specification. Due to the time-sensitive nature of some updates, such as the new music purchase example, it may not be desirable to convert the entire set of personalization data associated with the user, including user's current music catalog with the new song title, into a grammar specification following such an event. Instead, the grammar specification may be quickly modified (e.g., to account for the new music purchase), and a new personal model may be rapidly generated from the updated grammar specification. In some embodiments, a grammar specification may be modified to include new personalization data by adding, modifying or deleting a corresponding record, score or portion, rather than re-scoring the entire grammar specification from source personalization data.

Additional aspects of the present disclosure relate to maintaining and accessing personalization data in a format that facilitates efficient generation of personal spoken language understanding models, such as ASR or NLU models. Personalization data may be stored such that data sets or objects reflecting recent changes may be quickly accessed. For example, data in a personalization data store may be stored in separate data sets or "chunks." The data may be separated based on several factors, such as the time the data was received, the source of the data (e.g., the service from which user-specific data was obtained), the nature of the data (e.g., whether it is an initial load of user-specific data from a data source, or an update to previously stored data), etc. In some embodiments, a data harvesting service can store updates to previously received data sets such that they are separated either physically or logically from the previously received data sets (e.g., stored in a different file or data object, or stored in the same data object subject to an index that allows separate retrieval of each update). As a result, downstream processes (e.g., components that build personalized speech recognition models) may more easily obtain new personalization data without being required to access the entire catalog of user-specific data for a data source.

Further aspects of the present disclosure relate to prioritizing the generation of updated personal spoken language understanding models. As described above and in greater detail below, various events may drive the receipt of personalization data for a particular user. Some of those events may be strong predictors of subsequent user actions. When a data harvesting service receives update data associated with an event that is a strong predictor of subsequent user actions (e.g., purchase of a song), regeneration of a personal model that factors in such data may be prioritized over regeneration of personal models in response to other, less time-sensitive events (e.g., deletion of a song from the user's catalog). The prioritization may particularly useful in a system that provides SLU functionality to a large number of users (e.g., thousands or millions), and when that system receives a large volume of update notifications. In some embodiments, the system may scale the generation of personal models across multiple physical or virtual machines.

Although aspects of the embodiments described in the disclosure will focus, for the purpose of illustration, on applying partial updates to a grammar specification and generating a personal language model from the updated grammar specification for use by an ASR system, one skilled in the art will appreciate that the techniques disclosed herein may be applied to any number of services, process, or applications. For example, when personal language models are not generated from intermediate grammar specifications, a partial update may be applied to the source data for the personal language model or to the personal language model itself. As another example, other types of SLU models, such as personalized NLU models, may be generated, maintained and/or updated using the techniques described herein. Various aspects of the disclosure will now be described with regard to certain examples and embodiments, which are intended to illustrate but not limit the disclosure.

With reference to an illustrative embodiment, a user may utilize various applications and services, and those applications and services may obtain and/or generate user-specific information about the user. For example, the user may access and use music players, video players, personal information management systems, shopping web sites, social media networks, and the like. Some or all of these applications and services may maintain a data store that includes user-specific information, such as a catalog of songs or videos owned by the user, a list of the user's contacts and appointments, a purchase history, a listing of groups to which the user belongs, etc. In addition, some or all of these applications and services may allow the user to initiate certain actions or events, such as playing a song or video, making a phone call, browsing items for sale, viewing posts by other users, etc. Information about such user actions may or may not be stored in the data store associated with each application or service.

The user may also utilize speech recognition services, such as those provided by a network-based ASR system (which may or may not be part of a larger spoken language processing system), an ASR system executing locally on the user's client device, or the like. An ASR system may use a personalized language model (either alone or in conjunction with a general language model) to generate speech recognition results (e.g., transcripts of user utterances). The words in any particular model may be ranked, scored, or weighted so that words which are more likely to be used by a target population are given more weight in ASR hypotheses than words which are less likely to be used. User-specific data, such as the data associated with applications and services used by the user, can be a reliable predictor of which words a user will use in future utterances. Illustratively, if a user has purchased albums by a particular artist who is not a mainstream artist, the user is more likely than a user in the general population to make utterances (e.g., spoken commands to play music) that include that artist's name. If the artists name is given very low weight in the general language model, or is omitted altogether, then the user's experience may be less than satisfactory. A language model that uses weightings based on words that a particular user is likely to use can provide an improvement in accuracy in comparison to the use of a general language model alone.

FIG. 1 shows an illustrative data harvesting service 110 for obtaining personalization data for use in building personal language models. The data harvesting service 110 can obtain the personalization data from the various services used by user (e.g., a music player application or service, a shopping web site, a social network, etc.) via a network 130. In some embodiments, the data sources may be accessible via a network 130. In additional embodiments, the data sources may be accessible via a direct data link between computing systems, or the data source and data harvesting may both be part of a single computing system. The data sources described herein are illustrative only, and are not intended to be limiting. Generally described, any source of user-specific data may serve as a data source for the data harvesting service 110.

In some embodiments, data sources may provide notifications regarding updates to user-specific data. Illustratively, a user may interact with a music player to purchase a new album by an obscure local artist. The data store associated with the music player service may store a catalog of music owned by the user, and that catalog may be updated to reflect that the user now owns that particular album. A notification may be generated regarding the new purchase, and the data harvesting service 110 may receive the notification.

The data harvesting service 110 may process notifications and store data in the personalization data store 100 regarding any update reflected in the notification. The data may be stored in the form of an update data set. Update data sets may include information to be added to, or deleted from, some previously stored data set in the personalization data store 100. In some cases, the update data set may include the "delta," or difference, between the previously stored data and the current state of the user-specific data. The current state of user-specific data may therefore be obtained by combining the various data sets (e.g., a "primary" data set of initially received or previously aggregated data, and all subsequently received "update" data sets). In the present example, the user's catalog of music may already have been obtained and stored in the personalization data store 100. An update data set containing information about the new album may be stored in the personalization data store 100 separately from the primary data set (e.g., previously downloaded catalog). Storing update data sets separately from the primary data set with which they are associated facilitates efficient incremental updating for downstream processes, such as processes that update or rebuild personal language models based on such updates. Rather than obtaining the entire primary data set (e.g., the user's music catalog) which has already been incorporated into a model, only the new data (e.g., the new album) may be obtained and incorporated into the model, thereby reducing the amount of processing required to update the model.

The personalization data store 100 shows various primary data sets and update data sets. For example, primary data set 102 may correspond to the user's music catalog, and update data sets 104 and 106 may correspond to subsequent user actions, such as the purchase and playback of songs, respectively. Generally described, each update data set may reflect data regarding a different type of user action, and the user actions may or may not be time-sensitive from an ASR personalization standpoint. For example, the purchase of new songs may be time-sensitive because the user is likely to request playback of that song soon after the purchase. In addition, the purchase of new songs results in the storage of new data in a user's music catalog. Generating an updated personal model to reflect these update data sets 104 may be prioritized over the generation of updated personal models to reflect less critical update data sets 106. For example, update data sets 106 may reflect playback of songs. Playback of a song may not increase the likelihood of any particular word such that generating an updated personal model is time-sensitive.

The term data set is not intended to imply that each such data set must necessarily include more than one item of data, or encompass data from more than one notification. A data set, including an update data set, may include zero, one, or more items of data. For example, an update data set 104 or 106, may include a single new item data to add to a user catalog, multiple items of data to add to a user catalog, a reference to an item of data that is to be deleted from a user catalog, etc.

Note that the separate objects shown in FIG. 1 are illustrative only, and are intended only to show that update data sets may in some way be stored separately from original data sets with which they are associated. In some embodiments, each data set, represented by a separate block or cluster of blocks in the personalization data store 100, may be stored in a physically separate location. For example, each data set may be stored in a different physical file, data page, data table, etc. However, the update data sets need not be physically separated from the primary data set with which they are associated. In some embodiments, some or all of the data in the personalization data store may be stored in a single or small set of physical files or data pages, such as in various tables of a relational database. In these implementations, the update data sets may only be logically separated from the primary data sets with which they are associated. In the present example, all data from the music player service may be stored in a single table of a relational database, and that table may be indexed such that update data sets are logically separate units that can be quickly addressed and retrieved.

A personalized model generation module 120 may obtain data from the personalization data store 100 and generate a new personal model, as described in greater detail below. The data retrieved from the personalization data store 100 need not include all personalization data associated with a particular user, or even with a particular service used by the user. Rather, the data may be a single update data set 104, which may include data regarding a single change to the user-specific information associated with an application or a single user interaction with that application. The personal model generation module 120 can then update or regenerate a model that factors in the update data set 104. Illustratively, when updating a personal language model, the personal model generation module 120 can update an intermediate grammar specification, rather than completely regenerating or rescoring the grammar specification. This operation can be performed more quickly than a complete regeneration or rescoring, and a new personal model for the user can be rapidly generated from the updated grammar specification. In some embodiments, a full regeneration or rescoring of the grammar specification may be initiated subsequently, or in parallel. Such a rescoring of the grammar specification can lead to a more permanent personal model in cases where the rapidly generated personal model is intended to provide only temporary coverage of the update, as described below. Similar techniques may be used to update other types of spoken language understanding models, or alternative techniques may be used to update a personal language model. The personal model generation module 120 can store personal models in a models data store 140 for use by an ASR component or module.

Network Spoken Language Processing System Environment

Figure 2:
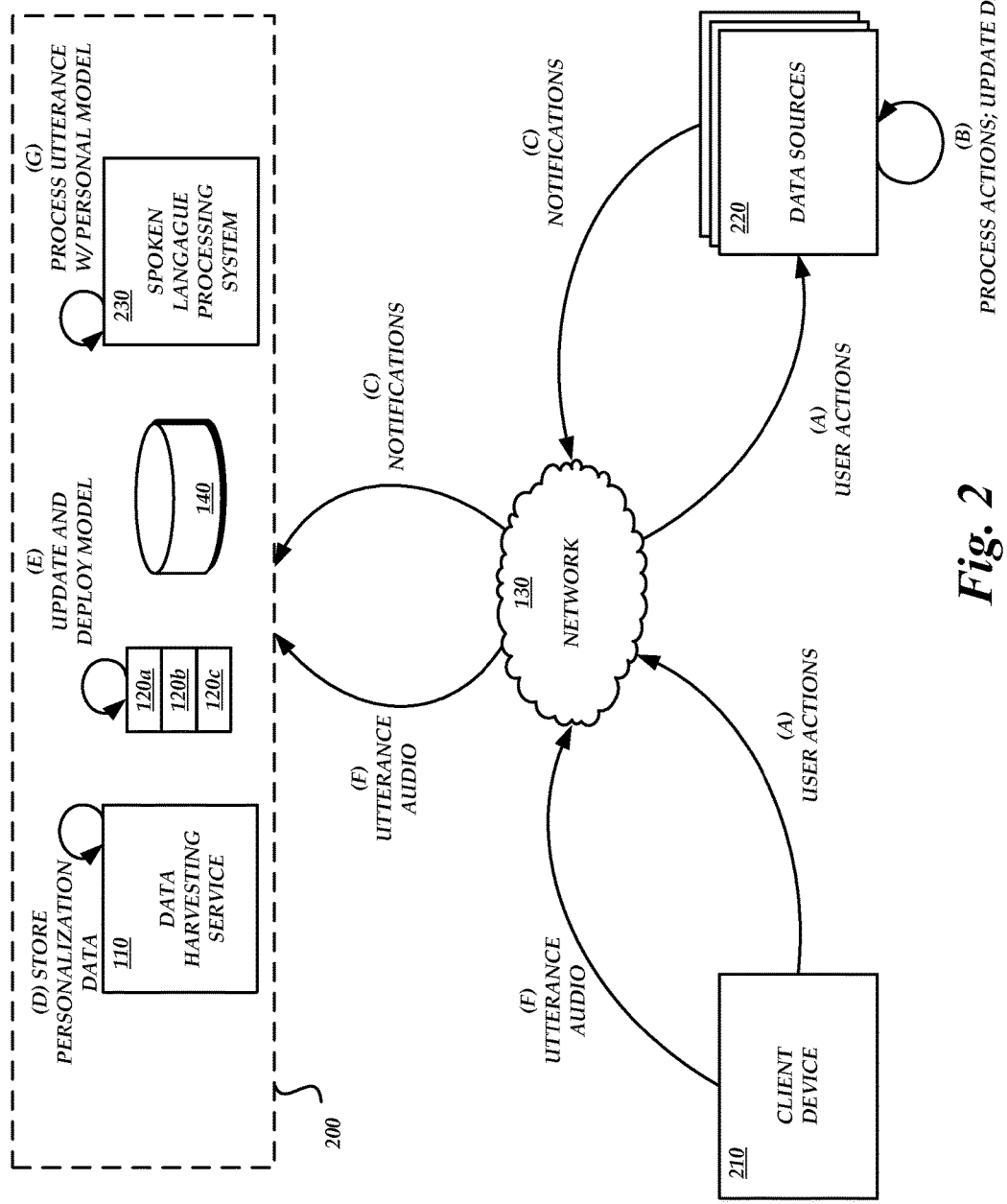
FIG. 2 is a block diagram of an illustrative spoken language processing system in a network environment, showing example interactions and data flows between the spoken language processing system and various computing systems.

FIG. 2 illustrates a networked speech processing environment in which the features and processes described herein may be implemented. The networked speech processing environment shown in FIG. 2 includes a network computing services provider 200, a client device 210, and multiple data sources source 220. The various systems may communicate with each other via a communication network 130. The network 130 may be a publicly accessible network of linked networks, possibly operated by various distinct parties, such as the Internet. In other embodiments, the network 130 may include a private network, personal area network, local area network, wide area network, cable network, satellite network, cellular telephone network, etc. or combination thereof, each with access to and/or from the Internet.

The network computing services provider 200 can be a computing system configured to provide various computing services, including spoken language processing and personalization. In some embodiments, the network computing services provider 200 can be a server or group of servers that may be accessed via the network 130. The network computing services provider 200 can include a number of components, such as a data harvesting service 110, personal model generation modules 120*a*-120*c*, a personal model data store 140, and a spoken language processing system 230 for performing automatic speech recognition and/or natural language understanding on user utterances.

The network computing services provider 200 may include multiple computing devices, such as computer servers, logically or physically grouped together. The components of the network computing services provider 200 can each be implemented as hardware, such as a server computing device, or as a combination of hardware and software. In addition, the components of the network computing services provider 200 can be combined on one server computing device or separated individually or into groups on several server computing devices. For example, a personal model generation module 120*a* may be implemented on the same server or group of servers as the data harvesting service 110, personal model data store 140, and/or the spoken language processing system 230. As another example, multiple personal model generation modules 120*a*-120*c* may be implemented as scalable computing systems that can scale responsive to current conditions (e.g., network conditions, processing load, computing resource availability, etc.). The data harvesting service 110 and/or personal model data store 140 may be implemented on a server or group of servers separate from the personal model generation modules 120-120*c* and/or the spoken language processing system 230. In some embodiments, the network computing services provider 200 may include additional or fewer components than those illustrated in FIG. 2. In some embodiments, the features and services provided by the network computing services provider 200 may be implemented as web services consumable via the communication network 130. In further embodiments, the network computing services provider 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The client device 210 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, set-top boxes, televisions configured with network access and program execution capabilities (e.g., "smart TVs"), and various other electronic devices and appliances.

At least some of the data sources 220 can correspond to a logical association of one or more computing devices for hosting interactive content and processing user interactions over the network 130. For example, a data source 220 may include a server that hosts an application module for providing music playback capabilities. The data source 220 may also include a server that hosts a data store for storing user-specific music catalogs.

A user of the client computing device 210 may perform various actions, and user actions data may be transmitted at (A) to a data source 220. For example, the user may initiate the purchase of a song from a music player service. A data source 220 may process the user actions, update or store data, and the like at (B). In the present example, the data source 220 may update the user's music catalog by adding the purchased song or adding data indicating that the user has purchased the song. The data source 220 may transmit a notification at (C) to a network computing services provider 200 and/or any other system or entity that has subscribed to notifications from the data source 220.

The network computing services provider 200 can store the personalized data at (D). The data harvesting service 110 may process the notification, extract any user-specific data relevant to speech recognition, and store an update data set in the personalization data store 100. A personal model generation module 120*a*-120*c* or some other component of the network computing services provider 200 may then update a personal model for the user at (E). As described in greater detail below, the network computing services provider 200 may prioritize generation of the personal model for the current update data set, and one of the personal model generation modules 120*a*-120*c* may be employed or assigned to update the personal model depending upon the particular prioritization applied to this update data set, the current processing load (e.g., other models to be generate for other users), and the like. The updated model may be deployed, such as by storing the updated model in the personal models data store 140, providing the updated model to the spoken language processing system 230, etc.

In some cases, shortly after the user action transmitted from the client device at (A), a user may make an utterance that is related to the prior user action. Utterance audio may be transmitted to the network computing services provider 200 at (F). The spoken language processing system 230 can process the utterance at (G), using the newly created personal module for the user generated based on the notification from the data source 220.

Process for Updating Personal Spoken Language Understanding Model

Figure 3:
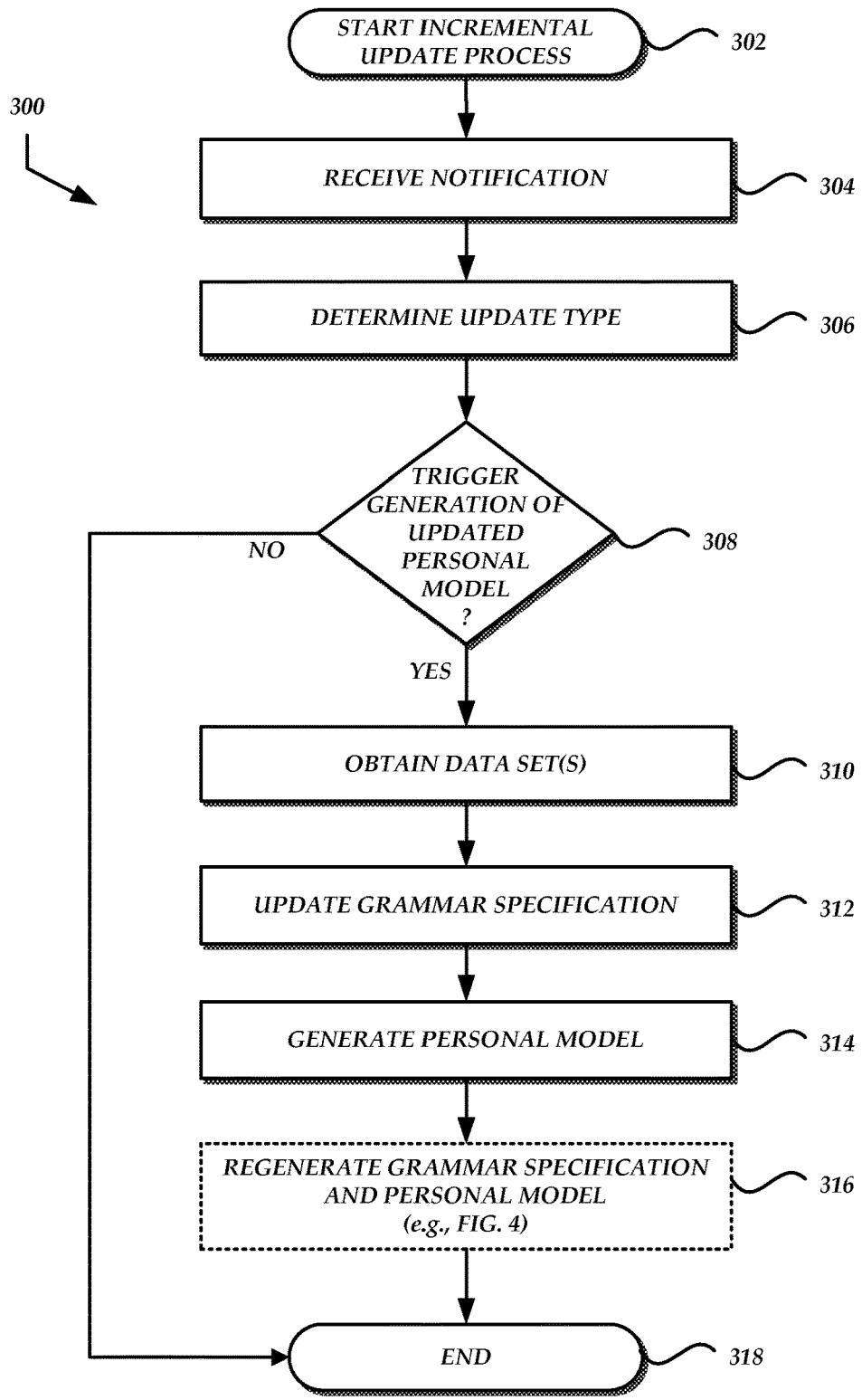
FIG. 3 is a flow diagram of an illustrative process for generating personal spoken language understanding models using subsets of personalization data.

FIG. 3 illustrates a sample process 300 for updating a personal model for a user based on receipt of data regarding an update or user action. Advantageously, a network computing services provider 200, or some combination of components thereof, such as a data harvesting service 110 and/or a personal model generation module 120, may execute the process 300 to quickly generate an updated personal model by modifying a grammar specification from which the personal model will be generate. This can reduce processing time and computing resource requirements that normally accompany a complete rescore or regeneration of a grammar specification.

The process 300 begins at block 302. For example, process 300 may begin manually or automatically upon receipt of a notification from a data source 220, or in response to some other event. The process 300 may be embodied in a set of executable program instructions stored on non-transitory computer-readable media, such as short-term or long-term memory of one or more computing devices associated with the network computing services provider 200. When the process 300 is initiated, the executable program instructions can be loaded and executed by the one or more computing devices.

At block 304, a notification may be received regarding the availability of new personalization data. In some embodiments, the data harvesting service 110 may be notified by a data source 220 that user-specific data has been modified or that a user action has been performed. The data harvesting service 110 can process that notification and store an update data set in the personalization data store 100. The update data set may be stored such that it is separate from one or more previously received data sets associated with the user and/or the data source (e.g., a primary data set), or the update data set may otherwise be stored such that it may be quickly retrieved separately from such previously received data sets that a user has registered as a new customer of the spoken language processing system 200. Systems and methods for obtaining and storing personalization data for spoken language understanding (e.g., ASR, NLU) are described in greater detail in U.S. Pat. No. 9,361,289, titled RETRIEVAL AND MANAGEMENT OF SPOKEN LANGUAGE UNDERSTANDING PERSONALIZATION DATA, which is incorporated by reference herein for all that it discloses. In some embodiments, the data harvesting service 110 may generate execute a procedure call, generate a notification, or otherwise cause some component of the network computing services provider 200 to potentially generate a new personal model based on the newly stored update data set.

At block 306, the personal model generation module 120 or some other module or component of the network computing services provider 200 can determine the type of update reflected by the newly stored update data set. For example, the update may be the addition of new user-specific data to a data source, such as the purchase of a new song. As another example, the update may be the deletion of user-specific data from a data source, such as the deletion of a song. As a further example, the update may be the modification of user-specific data at a data source, such as the modification of a user's playlist. As a still further example, the update may indicate a user action that may not necessarily involve a change in user-specific data at a data source, such as a request for playback of a song. These examples are illustrative only; in some embodiments, other update types may be determined.

At decision block 308, the personal model generation module 120 can determine whether the update is of a type that triggers generation of an updated personal model. In some cases, the decision may be made based on a cost-benefit analysis or a set of rules that help determine whether generation of an updated personal model provides enough of a benefit in terms of improved ASR results to justify the processing. For example, generating updated personal models to factor in some user actions (e.g., requests for playback of a song) may not provide a substantial benefit in terms of improved ASR results. This may be especially true in cases where the user has already requested playback of the song many times before, and the existing personal model already assigns an appropriate weight or score to the song title or other information. In some embodiments, rules and/or analyses regarding resource availability may be used to determine whether to trigger generation of an updated personal model, such as determining whether the spoken language processing system 200 is experiencing a high volume of updates. Additionally, or alternatively, the determination can be based at least partly on whether there are other update data sets that have been stored in the past and which have not triggered generation of an updated personal model. Although the update data sets may not individually trigger generation of an updated personal model, collectively the update data sets may provide a benefit in terms of improved ASR results. If the current update data set triggers the generation of an updated personal model, the process 300 may proceed to block 310.

At block 310, the personal model generation module 120 or some other module or component of the network computing services provider 200 can obtain the one or more update data sets to be used in generating the updated personal model. For example, with reference to FIG. 1, the most recently received notification may relate to the purchase of a song, and an update data set 104 may have been stored in the personalization data store 100 regarding the purchase. That update data set 104 may be obtained for use in generating an updated personal model. Other update data sets 106 which have not yet been incorporated into an updated personal model may also be retrieved.

At block 312, the personal model generation module 120 or some other module or component of the network computing services provider 200 can begin the processing of updating or generating a personal spoken language understating model for the current user, such as an ASR model (e.g., an acoustic model or a language model) or an NLU model (e.g., a named entity model or an intent model). The description which follows focuses, for purposes of illustration, on a specific example process for updating a language model by updating a grammar specification for the current user. However, processes for updating other types of spoken language models, or other processes for updating a language model, may be used.

Illustratively, a grammar specification that was created or updated during generation of the current personal language model for the user may have been stored, such as in the models data store 140. In some embodiments, the grammar specification may be stored as a textual representation of the personal model in the format of an individual file or files (e.g., a GrXML file). In one simple form, the grammar specification may include a list of words and associated scores representing the probability that utterances from the user will include the word. In some embodiments, the scores may be probabilistic such that they sum to 1. Based on the type of update to be applied, information may be added to the grammar specification, individual portions of the grammar specification may be deleted or modified, etc.

In some embodiments, modifying the grammar specification may include changing a score associated with a word. If scores for other words in the grammar specification are not also changed, then the scores may no longer sum to 1. However, a model may still be generated from such a grammar specification and used in ASR. A separate parallel or subsequent process, such as the process 400 described below, may be performed to regenerate the grammar specification or otherwise update other scores so that they sum to 1. For example, if a user purchases a new album by an artist, and that artist name is already listed in the grammar specification, then the score or weight associated with that artist may be increased due to the likelihood that the user will subsequently make an utterance regarding the artist (e.g., to play the new music by the artist). If the artist name or album name is not listed in the grammar specification, a new entry may be added with an appropriately high score or weight due again to the strong correlation between, e.g., purchasing an album and subsequently making an utterance about the album. The process 400, described below, may be executed subsequently or in parallel in order to generate a grammar specification with probabilistic scores that sum to 1.

At block 314, the personal model generation module 120 or some other module or component of the network computing services provider 200 may generate an updated personal model (e.g., generate an updated personal language model from the grammar specification updated above at block 312). In some embodiments, generating an "updated" personal model can include generating a new model to replace the existing personal model. In such cases, the new model is "updated" in the sense that it is based on an updated grammar specification. The updated personal model may be stored in the models data store 140 and used to perform ASR on subsequently received utterances.

In some embodiments, the process 300 may proceed to block 316, where the personal model generation module 120 or some other module or component of the network computing services provider 200 regenerates the grammar specification to incorporate the current update data set(s) and/or any other data sets that have not triggered an update. A personal model, generated from that grammar specification, may then replace the more temporary personal generated above at block 314. In these embodiments, the "updated" personal model generated above at block 314 is temporary in the sense that it will be replaced when a regenerated model, based on a regenerated grammar specification, is available. The process of regenerating a grammar specification and personal model is shown in FIG. 4 and described in greater detail below.

Process for Regenerating Personal SLU Models

Figure 4:
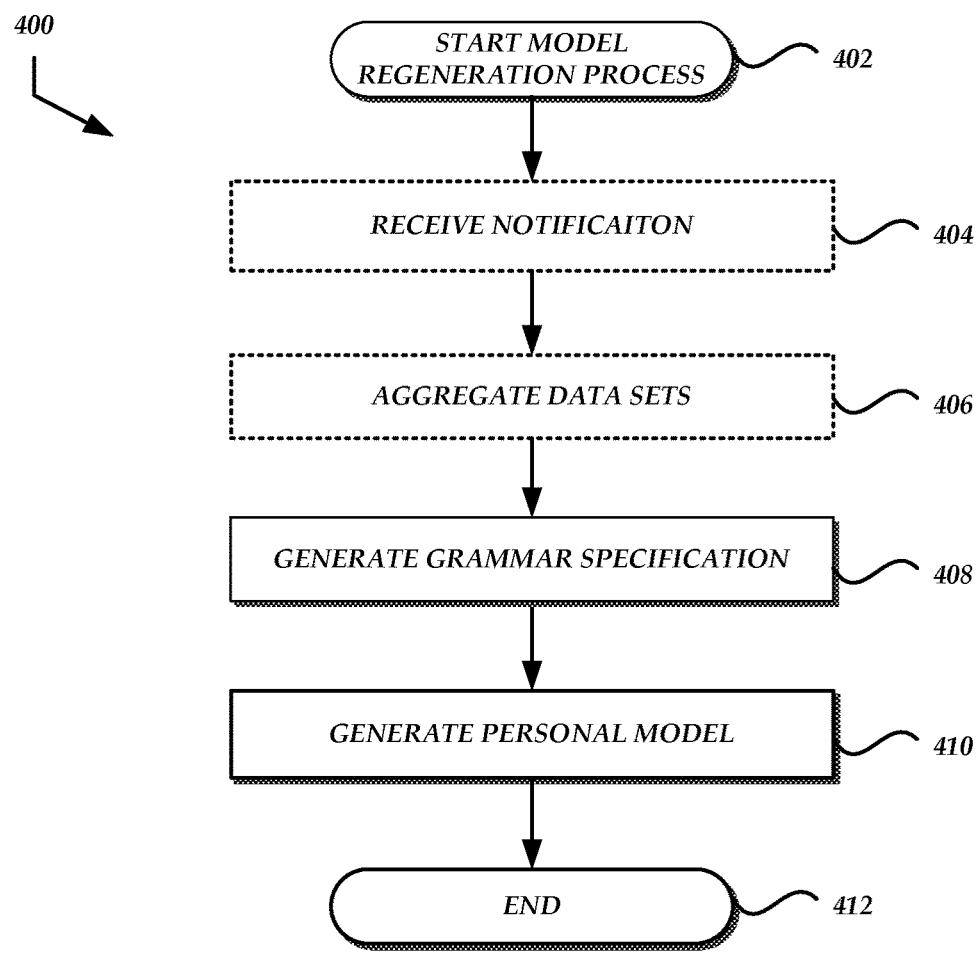
FIG. 4 is a flow diagram of an illustrative process for generating a personal spoken language understanding module using a data set of personalization data.

FIG. 4 illustrates a sample process 400 for regenerating a personal spoken language understanding model, such as an ASR model (e.g., a language model or acoustic model) or an NLU model (e.g., a named entity model or an intent model). The description which follows focuses, for purposes of illustration, on a specific example process for regenerating a personal language model by updating a grammar specification. Similar process for regenerating other types of spoken language understanding models, or alternative processes for regenerating a personal language model, may be used.

The process 400 can be used to generate a personal language model from a regenerated grammar specification, rather than an updated grammar specification, to replace a temporary or incremental personal language model. Advantageously, the regenerated grammar specification can fully incorporate updates to personalization data and the effect that such updates have on other portions of a user-specific grammar specification.

The process 400 begins at block 402. For example, if the process 400 is implemented by the spoken language processing system 200, the process 400 may begin manually or automatically after generation of a more temporary personal model, or in parallel with the generation of a more temporary personal model. The process 400 may be embodied in a set of executable program instructions stored on non-transitory computer-readable media, such as short-term or long-term memory of one or more computing devices associated with the spoken language processing system 200. When the process 400 is initiated, the executable program instructions can be loaded and executed by the one or more computing devices.

At block 404, the personal model generation module 140 or some other module or component of the spoken language processing system 200 can receive a notification regarding the availability of new personalization data for a particular user. In some embodiments, the notification may be received from a separate data source 220, as described above. In some embodiments, a separate notification may be generated by the data harvesting service 110, after a new data set has been added to the personalization data store. In some embodiments, no notification is generated; rather, the process 400 is initiated directly by the data harvesting service 110, the personal model update module 120, or some other module or component, or in response to some other event.

At block 406, two or more data sets may be aggregated prior to regenerating the personal model. As described above, primary data sets 102 and update data sets 104, 106 may be separately stored in the personalization data store 100 to facilitate incremental updates and other processes that use less than a complete set of personalization data for a particular user or service. In order to execute a full regeneration of the personal model, all user data (or some larger subset thereof) may be permanently or temporarily aggregated. The data may be temporarily aggregated for purposes of regenerating the personal model without altering the way the data is stored in the personalization data store 100. The data may be permanently aggregated (e.g., data files may be physically merged or the logical separation between data sets may be removed) in order to provide easier regeneration of personal models in the future, so that a prohibitively large number of small data sets do not need to be accessed each time a personal model is completely regenerated. In some embodiments, the data may not be aggregated at all, but rather the grammar specification may be built using a process that, e.g., iterates through each individually stored data set.

At block 408, the personal model generation module 120 or some other module or component of the spoken language processing system 200 can generate a new grammar specification from the user's personalization data. The generation of the new grammar specification may result in different scores or weightings for some words than, e.g., the incrementally updated grammar specification generated in the process 300 described above.

At block 410, the personal model generation module 120 or some other module or component of the spoken language processing system 200 can generate a new personal model from the grammar specification generated above in block 408.

Process for Prioritizing Generation of Personal SLU Models

Figure 5:
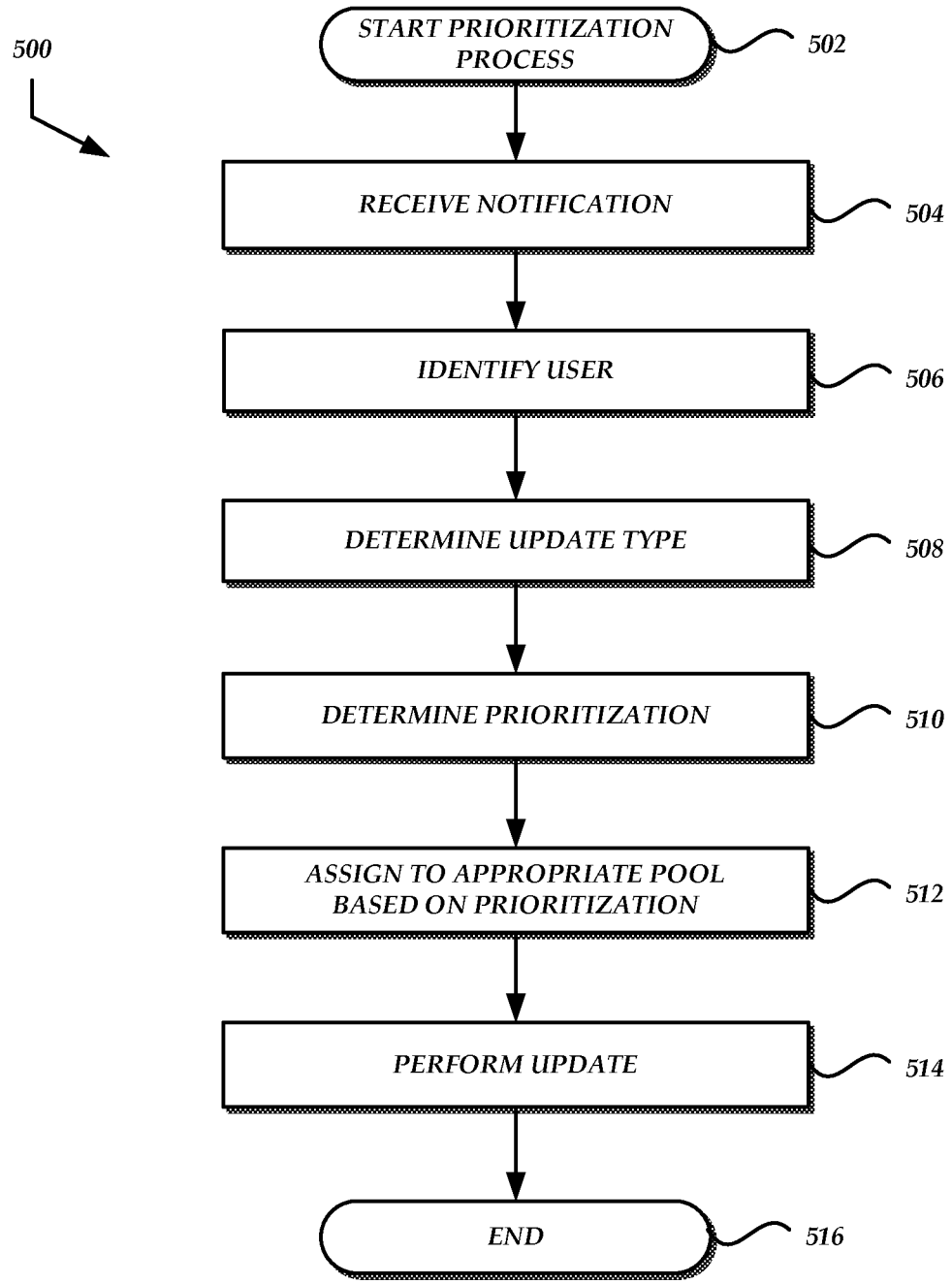
FIG. 5 is a flow diagram of an illustrative process for managing generation of personal spoken language understanding models on a prioritized basis.

FIG. 5 illustrates a sample process 500 for prioritizing personal model generation. Advantageously, the process 500 can be used to prioritize model generation tasks (e.g., such as those performed according to processes 300 and 400, described above) in an environment that serves a large number of users (e.g., thousands or millions). In such an environment, prioritized utilization of computing resources can be important to ensure that those model generation processes that have a greater potential positive impact on SLU results are given priority over those model generation processes that have a lesser potential impact.

The process 500 begins at block 502. For example, if the process 500 is implemented by the spoken language processing system 200, the process 500 may begin upon receipt of a notification of new personalization data. The process 500 may be embodied in a set of executable program instructions stored on non-transitory computer-readable media, such as short-term or long-term memory of one or more computing devices associated with the spoken language processing system 200. When the process 500 is initiated, the executable program instructions can be loaded and executed by the one or more computing devices.

At block 504, the spoken language processing system 200 may receive a notification of newly available user-specific data (e.g., from a data source 220), or newly stored personalization data (e.g., from a data harvesting service 110).

At block 506, the spoken language processing system 506 can identify the user. For example, the notification may include data regarding the identity of the user. In some embodiments, identifying the user can be important to prioritizing a personal model update task. Users that use the spoken language processing system (or system associated with a particular data source) more often may be given priority over those users that use the system less often, due to the greater potential for a positive impact on SLU results.

At block 508, the spoken language processing system 508 can determine the update type. In some embodiments, the update type (e.g., addition, deletion, or modification to personalization data; user action without modification; etc.) may be determined as described above with respect to FIG. 4. In some embodiments, incremental updates may be prioritized differently than full regenerations (e.g., incremental updates may be prioritized higher in order to quickly get a personalization implemented, while complete regenerations may be merely replacing such a quickly-implemented personalization and may take substantially longer to complete). Determining the update type can be important to prioritizing personal model update tasks because certain update types (e.g., additions of data) are more likely to impact personalization than others (e.g., deletions of data).

At block 510, the spoken language processing system 200 can determine the prioritization for the current personal model building process. Prioritization may be absolute, such as a predetermined or dynamically determined prioritization level assigned according to rules (e.g., based on the factors described above and/or other factors). Within a particular prioritization level, tasks may be ordered chronologically or according to some other scheme, or they may be ordered randomly. In some embodiments, prioritization may be relative, such that particular personal model building tasks are slotted in a queue or list of pending tasks according to the relative impact each may have on speech recognition personalization.

At block 512, the model building task may be assigned to a pool based on the prioritization determined above at block 510. For example, the spoken language processing system 200 may include two or more pools of servers or virtual machines that include a personal model generation module 120. One pool may be used for high priority model building tasks, and a second, separate pool may be used for lower priority model building tasks. When a model building task is assigned a low priority level, it may be placed in a queue to be processed by the pool of personal model generation modules 120 for low priority tasks. When a model building task is assigned a high priority level, the task may be assigned to the pool for high priority tasks. In some embodiments, the pools may share resources. For example, when the pool for high priority tasks has excess capacity, it may process tasks with lower priorities, and when the pool for low priority tasks has excess capacity, it may process tasks with higher priorities. In some embodiments, servers or personal model generation modules 120 may be dynamically allocated to pools based on current or expected processing load. In some embodiments, there may be three or more pools, depending upon the various prioritization levels.

At block 514, the personal model building task (e.g., an incremental update or full regeneration) can be performed, and the process 500 may terminate at block 516. As described above, a personal model generation module 120 may use update data to generate a personal spoken language understanding model, such as a language model or an NLU model. The model may be stored in the models data store 140, provided to a spoken language understanding processing module (e.g., an ASR or NLU module) for use, etc.

Additional Embodiments

Personal language models, whether generated from incrementally updated grammar specification or from fully regenerated grammar specifications, may rely on a list of words available to a larger general model with which the personal model is used during ASR. In the event that an update data set includes a new word that is not in the general model's word list, a grapheme-to-phoneme conversion may be performed. Grapheme-to-phoneme conversion can increase the size of the personal model. However, it may be desirable to keep personal models small (e.g., to enable fast retrieval and storage of the personal models). As new words are added to the personal models of multiple users (e.g., a word has been added to the personal models of a threshold number or percentage of users), the spoken language processing system 200 can update the general language model to include those words, and therefore shrink the size of future personal models. A versioning scheme may be employed which ties personal models to the general model that was in use when the personal model was generated. This can be important because a newer personal model that relies on a word list associated with a new general model may not work with an older general model.

In addition to personalization, supplemental models in general may be utilized to provide delta updates to the general models. For example, a larger general model may be generated once a week, while a smaller supplemental model may be generated daily (e.g., based upon news events, new "common" words, etc.). Separating general models in this way can enable faster model builds by using a smaller data set for the model. The versioning scheme described above may also be used to tie each smaller general model to a particular larger model. Versioning may also be useful in tying personal models to particular combinations of general models and supplemental general models, etc.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    a data harvesting service comprising one or more server computing devices configured to at least:
        store spoken language understanding personalization data associated with a user, wherein:
            the spoken language understanding personalization data comprises a plurality of separate data sets; and
            each of the plurality of separate data sets is accessible independently from each remaining data set of the plurality of data sets;
        receive a new data set of the spoken language understanding personalization data, wherein:
            the new data set is associated with the user; and
            the new data set comprises activity data received from a plurality of services, wherein the activity data is related to actions initiated by the user that cause one or more of the plurality of services to change user-specific data associated with the user; and
        transmit, to a model generation service, a notification that the new data set associated with the user is available; and
    a model generation service comprising one or more server computing devices configured to at least:
        generate a personal language model, associated with the user, based at least in part on at least a portion of the plurality of separate data sets;
        receive the notification that the new data set associated with the user is available;
        determine a predicted action of the user based at least in part on the activity data of the new data set;
        determine that a word associated with the predicted action is not present in a general language model; and
        in response to determining that the word is not present in the general language model, modify the personal language model based at least partly on a likelihood that the user will use the word; and
    a speech recognition service comprising one or more computing devices configured to at least:
        receive audio data representing a user utterance;
        access the personal language model that is modified; and
        generate speech recognition results using the audio data and the personal language model that is modified.

2. The system of claim 1, wherein the personal language model comprises at least one of a personal n-gram language model or a personal grammar.

3. The system of claim 1, wherein the one or more server computing devices of the model generation service are further configured to determine a priority for modifying the personal language model, the priority based at least partly on one of: a user identifier; an update type; a volume of model generation processes; or computing resource availability.

4. The system of claim 1,
    wherein the one or more server computing devices of the model generation service are further configured to generate a grammar specification associated with the user based at least partly on the new data set and at least one of the plurality of separate data sets; and
    wherein the one or more server computing devices of the model generation service being configured to modify the personal language model comprises the one or more server computing devices of the model generation service being configured to modify the personal language model using the grammar specification.

5. A computer-implemented method comprising:
    obtaining, by a first service comprising one or more computing devices, spoken language understanding personalization data associated with a first user of a plurality of users, wherein the spoken language understanding personalization data comprises activity data received from one or more of a plurality of services, and wherein the activity data is related to actions initiated by the first user that cause one or more of the plurality of services to change user-specific data associated with the first user;
    storing, by the first service, the spoken language understanding personalization data in association with previously stored spoken language understanding personalization data associated with the first user;
    providing, to a second service comprising one or more computing devices separate from the one or more computing devices of the first service, a notification that the spoken language understanding personalization data is available, and the spoken language understanding personalization data;

determining, by the second service, a predicted action of the first user based at least in part on the activity data of the spoken language understanding personalization data;

determining, by the second service, that a word associated with the predicted action is not present in a general spoken language understanding model;

in response to determining that the word is not present in the general spoken language understanding model, modifying, by the second service, a personal spoken language understanding model associated with the first user based at least on a likelihood that the first user will use the word;

receiving audio data representing an utterance of the first user; and generating speech recognition results using the audio data and the personal spoken language understanding model that is modified.

6. The computer-implemented method of claim 5, wherein the personal spoken language understanding model comprises one of an n-gram language model, a grammar, or a natural language understanding model.

7. The computer-implemented method of claim 5, wherein modifying the personal spoken language understanding model comprises modifying a grammar specification associated with the first user.

8. The computer-implemented method of claim 7, wherein modifying the grammar specification comprises at least one of: adding a score, deleting a score, or modifying a score.

9. The computer-implemented method of claim 5, wherein the spoken language understanding personalization data comprises at least one of: data regarding an update to the previously stored spoken language understanding personalization data, or new data in addition to the previously stored spoken language understanding personalization data.

10. The computer-implemented method of claim 5, further comprising:

generating a grammar specification associated with the first user based at least partly on the spoken language understanding personalization data and at least a portion of the previously stored spoken language understanding personalization data; and generating a second spoken language understanding model, associated with the first user, based at least partly on the grammar specification.

11. The computer-implemented method of claim 5, further comprising:

determining a first priority level for modifying the personal spoken language understanding model.

12. The computer-implemented method of claim 11, further comprising:

obtaining additional spoken language understanding personalization data associated with a second user; and determining a second priority level for modifying a second personal spoken language understanding model associated with the second user.

13. The computer-implemented method of claim 12, further comprising:

determining that the second priority level exceeds the first priority level; and modifying the second personal spoken language understanding model based at least on the additional spoken language understanding personalization data prior to modifying the personal spoken language understanding model.

14. The computer-implemented method of claim 12, further comprising modifying the personal spoken language understanding model and the second personal spoken language understanding model in parallel on separate server computing devices of the second service.

15. The computer-implemented method of claim 5, wherein the actions initiated by the first user comprise one or more of making a purchase, playing a song, playing a video, making a phone call, browsing items for sale, or viewing posts by another user.

16. The computer-implemented method of claim 5, wherein the user-specific data comprises one or more of a catalog of songs owned by the first user, a purchase history of the first user, and a listing of groups to which the first user belongs.

17. The computer-implemented method of claim 5, wherein modifying, by the second service, the personal spoken language understanding based at least on the spoken language understanding personalization data comprises modifying the personal spoken language understanding model to reflect changes to the user-specific data associated with the actions initiated by the first user.

18. The computer-implemented method of claim 5, wherein the activity data is not related to other actions initiated by the first user that do not cause one or more of the plurality of services to change the user-specific data associated with the first user.

19. The computer-implemented method of claim 5, further comprising:

determining a frequency of the actions initiated by the first user; and determining to modify the personal spoken language understanding model based on the frequency of the actions initiated by the first user.

20. The computer-implemented method of claim 5, wherein storing the spoken language understanding personalization data in association with previously stored spoken language understanding personalization data associated with the first user comprises storing the activity data separately from the previously stored spoken language understanding personalization data.

21. The computer-implemented method of claim 5, further comprising determining, from the personal spoken language understanding model, a score associated with the word, wherein the score indicates a likelihood that an utterance from a user in a general population will include the word.

22. The computer-implemented method of claim 21, wherein modifying the personal spoken language understanding model comprises modifying the score based at least in part on the likelihood that the first user will use the word.

23. The computer-implemented method of claim 5, wherein the type of spoken language understanding personalization data in the new data set comprises at least one of: a modification to previously-received spoken language understanding personalization data; an addition to previously-received spoken language understanding personalization data; a deletion of previously-received spoken language understanding personalization data; and interaction logging data regarding in interaction with an object associated with previously-received spoken language understanding personalization data.

24. The computer-implemented method of claim 5, further comprising determining, by the second service, that a type of the spoken language understanding personalization data satisfies a criterion for triggering modification of the personal spoken language understanding model associated with the first user, wherein the criterion for triggering modification of the spoken language understanding model comprises the type of spoken language understanding personalization data being associated with an improvement in accuracy of the spoken language understanding model.

25. The computer-implemented method of claim 5, further comprising determining, by the second service, that a type of the spoken language understanding personalization data satisfies a criterion for triggering modification of the personal spoken language understanding model associated with the first user, wherein the criterion for triggering modification of the personal spoken language understanding model comprises the type of spoken language understanding personalization data being associated with a threshold amount of spoken language understanding personalization data received after last modifying the spoken language understanding personalization data.

26. The computer-implemented method of claim 5, wherein the general spoken language understanding model is associated with the plurality of users, and wherein the personal spoken language understanding model is uniquely associated with the first user.

27. The computer-implemented method of claim 5, further comprising:
   determining that the word has been added to a threshold number of spoken language understanding models; and
   modifying the general spoken language understanding model based at least on a likelihood that the word will be used.

28. The computer-implemented method of claim 5, wherein the determining, by the second service, that the word is not present in the general spoken language understanding model is performed in response to the second service being provided with the spoken language understanding personalization data.

29. The computer-implemented method of claim 5, further comprising:
   determining that the word is not present in the personal spoken language understanding model associated with the first user,
   wherein the determining that the word is not present in the general spoken language understanding model is performed in response to the determining that the word is not present in the personal spoken language understanding model associated with the first user.

30. The computer-implemented method of claim 5, wherein the determining that the word is not present in the general spoken language understanding model comprises determining that an n-gram, corresponding to the word, is not present in the general spoken language understanding model.

31. The computer-implemented method of claim 5, wherein the determining that the word is not present in the general spoken language understanding model is based at least partly on:
   analyzing a specification associated with the general spoken language understanding model; and
   determining that data corresponding to the word is not present in the specification.

32. One or more non-transitory computer readable media comprising executable code that, when executed, cause one or more computing devices to perform a process comprising:
   obtaining, by a first service, spoken language understanding personalization data associated with a first user of a plurality of users,
      wherein the spoken language understanding personalization data comprises activity data received from a plurality of services, and
      wherein the activity data is related to actions initiated by the first user that cause one or more of the plurality of services to change user-specific data associated with the first user;
   storing, by the first service, the spoken language understanding personalization data in association with previously stored spoken language understanding personalization data associated with the first user;
   providing, to a second service, a notification that the spoken language understanding personalization data is available, and the spoken language understanding personalization data;
   determining, by the second service, a predicted action of the first user based at least in part on the activity data of the spoken language understanding personalization data;
   determining, by the second service, that a word associated with the predicted action is not present in a general spoken language understanding model;
   in response to determining that the word is not present in the general spoken language understanding model, modifying, by the second service, a personal spoken language understanding model associated with the first user based at least on a likelihood that the first user will use the word;
   receiving audio data representing an utterance of the first user; and
   generating speech recognition results using the audio data and the personal spoken language understanding model that is modified.

33. The one or more non-transitory computer readable media of claim 32, wherein the process further comprises:
   determining a first priority level for modifying the personal spoken language understanding model;
   obtaining additional spoken language understanding personalization data associated with a second user;
   determining a second priority level for modifying a second personal spoken language understanding model associated with the second user;
   determining that the second priority level exceeds the first priority level; and
   modifying the second personal spoken language understanding model based at least on the additional spoken language understanding personalization data prior to modifying the personal spoken language understanding model.

* * * * *